(12) United States Patent
Fairchild

(10) Patent No.: US 7,604,792 B2
(45) Date of Patent: Oct. 20, 2009

(54) SEPARATION OF PURIFIED POTASSIUM SULFATE FROM GLASERITE

(75) Inventor: James Logan Fairchild, Trona, CA (US)

(73) Assignee: Searles Valley Minerals Operations Inc., Overland Park, KS (US)

( * ) Notice: Subject to any disclaimer, the term of this patent is extended or adjusted under 35 U.S.C. 154(b) by 0 days.

(21) Appl. No.: 12/252,591

(22) Filed: Oct. 16, 2008

(65) Prior Publication Data

US 2009/0104106 A1 Apr. 23, 2009

Related U.S. Application Data

(60) Provisional application No. 60/980,615, filed on Oct. 17, 2007.

(51) Int. Cl.
*C01D 5/00* (2006.01)
*B03B 5/60* (2006.01)
(52) U.S. Cl. .................. 423/551; 209/162; 209/163; 423/552
(58) Field of Classification Search ................. 423/199, 423/551, 552; 209/162–163
See application file for complete search history.

(56) References Cited

U.S. PATENT DOCUMENTS

| | | | |
|---|---|---|---|
| 1,936,070 A | 11/1933 | Ritchie et al. | |
| 2,969,275 A | 1/1961 | Garrett | |
| 3,111,383 A | 11/1963 | Garrett | |
| 3,479,294 A | 11/1969 | Weck | |
| 3,685,652 A * | 8/1972 | Chemtob et al. | ............ 209/166 |
| 4,215,100 A * | 7/1980 | Sokolov et al. | ............. 423/552 |

OTHER PUBLICATIONS

Linke, William F., Solubilities, vol. II, Fourth Edition, 1965, pp. 315-317, American Chemical Society, Washington, D.C.

* cited by examiner

*Primary Examiner*—Stuart Hendrickson
*Assistant Examiner*—Richard M Rump
(74) *Attorney, Agent, or Firm*—Fish & Richardson P.C.

(57) ABSTRACT

A method can, in one general aspect, include steps for the recovery of potassium sulfate and mirabilite from glaserite. In another general aspect, a method includes dissolving glaserite in water at an elevated temperature to produce a saturated or nearly saturated solution, and cooling the solution to a temperature where potassium sulfate and mirabilite will crystallize from the solution as stable phases. In yet another general aspect, a method includes adding glaserite to a saturated solution of glaserite in water and mixing for enough time at a temperature where the glaserite will decompose into potassium sulfate and mirabilite as stable phases. In yet another general aspect, a method includes separating potassium sulfate from mirabilite using a froth floatation process.

36 Claims, No Drawings

SEPARATION OF PURIFIED POTASSIUM SULFATE FROM GLASERITE

CROSS REFERENCE TO RELATED APPLICATIONS

This application claims priority under 35 U.S.C. §119(e) to U.S. Application No. 60/980,615, filed Oct. 17, 2007, the contents of which are fully incorporated herein by reference.

TECHNICAL FIELD

This disclosure relates to methods for production of potassium sulfate, and more particularly to recovering potassium sulfate from glaserite.

BACKGROUND

Glaserite is the double salt of potassium and sodium sulfate. Chemically, the mineral has the formula $K_3Na(SO_4)_2$ and is a common intermediate compound in the production of potassium sulfate. Potassium sulfate is a frequently-used specialty potassium fertilizer for certain agricultural crops, especially those crops that are sensitive to chloride.

U.S. Pat. No. 1,936,070 discloses several processes for producing glaserite. In one process, solid sodium sulfate is added to a strongly concentrated or saturated solution of potassium chloride in water. A second process is to add solid potassium chloride to a strongly concentrated or saturated solution of sodium sulfate in water. In a third process, glaserite can also be produced by dissolving both potassium chloride and sodium sulfate in water, then evaporating the water to cause glaserite to crystallize, with the evaporation continuing until the byproduct sodium chloride becomes saturated in the solution.

Glaserite produced by any of these processes can be of sufficient purity for further processing into potassium sulfate product without further purification. All three processes described above share a common chemical reaction:

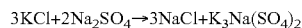

$3KCl+2Na_2SO_4 \rightarrow 3NaCl+K_3Na(SO_4)_2$

All three of the above processes typically require potassium chloride and sodium sulfate in the form of finished or nearly finished products as raw materials. This can make the aforementioned processes relatively expensive.

Another route for the production of glaserite is solar evaporation of certain naturally occurring brines that contain sodium, potassium and sulfate. Examples of such brines are those in Searles Lake, Calif. and the brine in Utah's Great Salt Lake. The solar evaporation of naturally occurring brine, such as the examples given, has the advantage of having a very low cost raw material for the constituents in glaserite. However, glaserite produced by these methods is typically mixed with several undesirable salts, for example, sodium chloride. These undesirable salts typically must first be separated to produce a purified glaserite of a quality that is suitable for further processing into potassium sulfate. U.S. Pat. No. 3,675,773 describes flotation separation of glaserite from sodium chloride and other salts.

Yet another process to produce glaserite is the solvent extraction process to produce boric acid from complex brine, for example the brine in Searles Lake, as described in U.S. Pat. Nos. 2,969,275, 3,111,383 and 3,479,294. In this process a byproduct mixture that contains both glaserite and anhydrous sodium sulfate is produced in addition to the principal boric acid product. This mixture of sulfate salts contains from 25% to 75% glaserite with the balance being anhydrous sodium sulfate.

A traditional process for recovering potassium sulfate from glaserite is described in U.S. Pat. No. 1,936,070. In the process of this patent, glaserite is leached with a saturated solution of potassium chloride in water. This patent suggests that the leaching should typically occur at normal room temperature, between 15-40° C., although temperatures outside this range were said to produce product of satisfactory quality. Following the teachings in this patent a digestion-leaching process can be operated to replace substantially all of the sodium in the glaserite with potassium.

The leaching process described in this patent has two process inefficiencies. First, the leach solution leaves saturated in potassium sulfate and glaserite. This means that part of the sulfate in the glaserite feed to the leach process is dissolved into the leach brine and is no longer available to make potassium sulfate product. If the leach occurs at 35° C. and the molar ratio of sodium/potassium in the glaserite is the theoretical 0.333, the dissolution of sulfate will result in about 5.3% of the yield of potassium sulfate being lost to the end liquor.

The other inefficiency is that the potassium concentration in the spent leach brine is quite high because the solution leaves saturated in potassium sulfate and glaserite. This means that the process efficiency for potassium is relatively low. If the leach occurs at 35° C. and the molar ratio of sodium/potassium in the glaserite is the theoretical 0.333, the residual potassium in the spent leach brine will still be about 71% of the potassium supplied in the potassium chloride leach brine.

As the sodium content in the glaserite increases due to the solid solution of sodium sulfate, the inefficiencies described above also increase, because more water must be used to carry away the additional sodium. When the molar ratio of sodium/potassium in the glaserite is 0.50, the loss of sulfate will be about 8% and the residual potassium in the spent leach brine will increase to about 81% of the potassium supplied in the potassium chloride leach brine.

U.S. Pat. No. 1,936,070 describes the use of the mother liquor that results from leaching glaserite to potassium sulfate to produce additional glaserite. Sodium sulfate can be added to this mother liquor to precipitate the contained potassium as additional glaserite. Doing so can recover much of the residual potassium in the mother liquor resulting in a substantially higher overall potassium yield than otherwise possible. However, the added sodium sulfate must be relatively pure and be especially low in sodium chloride. The sodium sulfate is therefore relatively costly.

The second step conversion of glaserite to potassium sulfate as described in U.S. Pat. No. 1,936,070 cannot achieve high yields of potassium and sulfate unless it is coupled with a first step where glaserite is recovered from the mother liquor that results from leaching glaserite to potassium sulfate. If glaserite is recovered from other sources, such as solar ponds or other process, it will be expected to be the principal raw material for the production of potassium sulfate. As such it would be undesirable to produce glaserite from the potassium sulfate mother liquor as well. The process in U.S. Pat. No. 1,936,070 would also require the supply of a large amount of potassium chloride to digest the glaserite to potassium sulfate and it may be very undesirable to have to supply this costly raw material.

SUMMARY

A method may, in one general aspect, include steps for the recovery of potassium sulfate and mirabilite from glaserite. In another general aspect, a method includes dissolving glaserite in water at an elevated temperature to produce a saturated or nearly saturated solution, and cooling the solution to a temperature where potassium sulfate and mirabilite will crystallize from the solution as stable phases. In yet another general aspect, a method includes adding glaserite to a saturated solution of glaserite in water and mixing for enough time at a temperature where the glaserite will decompose into potassium sulfate and mirabilite as stable phases. In yet another general aspect, a method may include a process for separating potassium sulfate from mirabilite using a froth floatation process.

In selected embodiments of the above aspects, the potassium sulfate is recovered through a froth floatation process. In some embodiments the potassium sulfate recovered is substantially pure; in some embodiments the potassium sulfate recovered includes less than 10% mirabilite, glaserite, or other contaminants. In some embodiments the froth flotation process includes forming bubbles within the solution after the glaserite has decomposed into potassium sulfate and mirabilite, and the bubbles carry the potassium sulfate to the solution surface. In some embodiments the bubbles include air or an inert gas. In some embodiments, the method can further include a collector reagent, for example, a sulfonated hydrocarbon. In some embodiments the sulfonated hydrocarbon is an unsaturated sulfonated hydrocarbon, such as a monoalkene. In some embodiments the sulfonated hydrocarbon comprises at least eight carbon atoms.

In other embodiments the sulfonated hydrocarbon can include one or more of sulfonated pentenes, hexenes, heptenes, octenes, nonenes, decenes, undecenes, dodecenes, tridecenes, tetradecenes, pentadecenes, hexadecenes, octadecenes, eicosenes, heneicosenes, doeicosenes, trieicosenes, and tetraeicosenes. In some embodiments the sulfonated hydrocarbon includes one or more of a sulfonated 1-tetradecene, 1-pentadecene, 1-hexadecene, and 1-octadecene.

In some embodiments, the sulfonated hydrocarbon is added to the solution in an amount equivalent to about 50 to 500 grams per ton of potassium sulfate contained therein.

In some embodiments the temperature modification includes adjusting the solution temperature to a temperature range of about −2.7° C. to about 1.8° C.

In some embodiments the methods include recovering mirabilite from the solution, and in preferred embodiments, the recovered mirabilite is substantially purified. In one embodiment, the recovered mirabilite includes mirabilite with less than 1% impurities. In some cases recovering purified mirabilite occurs after removing the potassium sulfate from the solution.

In some embodiments the solution is saturated with glaserite, and in some embodiments the solution comprising glaserite is an aqueous solution.

In some embodiments the solution comprising glaserite comprises a recycled solution comprising glaserite. The recycled solution can be derived from a solution produced by the methods described herein.

In yet another general aspect, a process for the production of purified potassium sulfate from glaserite includes: a) converting glaserite within an aqueous solution comprising glaserite into potassium sulfate and mirabilite by reducing the solution temperature to between about −2.7° C. and 1.8° C.; and b) separating the potassium sulfate and mirabilite using a froth floatation process, wherein the froth floatation process comprises adding a sulfonated hydrocarbon to the aqueous solution, wherein the sulfonated hydrocarbon comprises from about 12 to about 16 carbon atoms and is added in an amount equivalent to about 50 to 500 grams per ton of contained potassium sulfate crystals. The froth flotation can produce a float containing predominantly potassium sulfate and a residual of non-floated material containing predominantly mirabilite.

In some embodiments, the potassium sulfate is recovered from the froth floatation process. In some embodiments, the potassium sulfate includes less than 10% mirabilite or other impurities. In some embodiments, the aqueous solution is saturated in glaserite and at a temperature of between about −2.7° C. and about 1.8° C. In some embodiments the sulfonated hydrocarbon is one or more of the following: sulfonated 1-tetradecene, sulfonated 1-pentadecene, sulfonated 1-hexadecene, and sulfonated 1-octadecene.

The details of one or more embodiments are set forth in the description below. Other features, objects, and advantages will be apparent from the claims.

DETAILED DESCRIPTION OF ILLUSTRATIVE EMBODIMENTS

This disclosure provides materials and methods for producing potassium sulfate by causing glaserite (the double salt of potassium and sodium sulfate, $K_3Na(SO_4)_2$) to decompose into separable crystals of potassium sulfate and sodium sulfate decahydrate (commonly known as mirabilite). In certain embodiments the method includes producing a slurry of glaserite in water that is saturated in glaserite and maintaining the slurry within a certain temperature range. In some embodiments the slurry can contain from 3% to 50%, for example, from 3% to 6%, from 6% to 9%, from 9% to 12%, from 12% to 15%, from 15% to 18%, from 18% to 21%, from 21% to 24%, from 24% to 27%, from 27% to 30%, from 30% to 33%, from 33% to 36%, from 36% to 39%, from 39% to 42%, from 42% to 45%, from 45% to 48%, or from 48% to 50% undissolved glaserite solids by weight. Within certain temperature ranges, for example between −2.7° C. and 1.8° C., glaserite is not phase-stable and can therefore spontaneously decompose into potassium sulfate and mirabilite. Alternatively, the glaserite can be partially or completely dissolved in water at an elevated temperature between 40° C. and 100° C.; this solution can then be cooled to a temperature between −2.7° C. and 1.8° C., and potassium sulfate and mirabilite can be crystallized free of glaserite.

The possible solid phases of potassium sulfate and sodium sulfate in water are potassium sulfate, anhydrous sodium sulfate, mirabilite, glaserite, and ice. At almost all temperatures, solid-phase potassium sulfate cannot be in equilibrium with either of the solid phases of sodium sulfate. A solubility region where glaserite is the only stable phase almost always separates potassium sulfate and sodium sulfate phases. This means that only potassium sulfate and glaserite can coexist or glaserite and a solid phase of sodium sulfate can coexist in solution at a given temperature.

Potassium sulfate can coexist, however, with mirabilite if the temperature is between approximately −2.7° C. and 1.8° C. In this temperature range glaserite is no longer a stable phase and given sufficient time as a slurry in water, glaserite will convert to potassium sulfate and mirabilite. Similarly, if a solution that is saturated in glaserite alone or saturated in glaserite and/or a sodium sulfate solid phase (anhydrous sodium sulfate or mirabilite) at a temperature above 20° C., only potassium sulfate and mirabilite will crystallize if the solution is cooled below 1.8° C.

While separate crystals of potassium sulfate and mirabilite can be formed in either process, it can be advantageous if potassium sulfate and mirabilite can also be separated from each other. A mixture of co-crystallized potassium sulfate and mirabilite can be separated into purified fractions of each salt by a froth flotation process. These separated fractions can then be filtered to recover the respective products. The collector reagent for this froth flotation can be a sulfonated hydrocarbon, preferably one containing at least eight carbon atoms. The mother liquor left after the froth flotation process and filtration of the respective potassium sulfate and mirabilite concentrates can be returned directly to the co-crystallization digester or used to dissolve additional glaserite. By reusing the filtrate in either of these manners, the potassium and sodium sulfate in the filtrate can also be recovered. By reusing this liquor a yield in excess of 95% of the potassium contained in the glaserite raw material can be achieved with over 90% of the sodium being rejected as mirabilite.

In this process an active organic collector reagent, or a combination of two or more active organic collector reagents, can be added to a slurry containing both potassium sulfate and mirabilite. The active organic collector reagent(s) are sulfonated organic compounds. The sulfate portion of these reagents has an affinity for potassium sulfate, and when allowed enough time the sulfate portion of the reagent molecule will preferentially absorb onto the surface of the potassium sulfate crystals.

The organic portion of these reagent molecules, however, has no affinity for either the crystals or the solution. Instead it seeks a gas surface free of both crystals and solution where it can mix with the organic portion of reagent molecules. The slurry of potassium sulfate and mirabilite, when treated with the collector reagent or reagents, can then be subjected to froth flotation by adding air, or other sparingly soluble gas such as nitrogen, oxygen, carbon dioxide or methane, into the slurry very near the bottom of the agitated vessel containing the slurry. During froth flotation the organic portions of the reagent molecules gather on the inside of the bubbles. Because these reagents are also attached to the potassium sulfate crystals, the crystals become attached to the bubbles. Then as the bubbles rise to the surface, they carry the potassium sulfate crystals to the surface as well. There, the potassium sulfate can be captured and separated from the bulk of the slurry in the vessel. The captured flotation froth can be filtered to recover a purified potassium sulfate product.

As the froth floatation process continues, the bulk slurry becomes depleted in potassium sulfate, eventually reaching a point where just mirabilite, mother liquor, and only trace quantities of potassium sulfate remain in the flotation vessel. At this point, the purified mirabilite can be recovered by filtration of the slurry.

Organic collection reagent(s) can generally be sulfonated hydrocarbons; preferably, the collection reagent(s) are sulfonated alpha-olefins and sulfonated unsaturated petroleum fractions (alkenes), which are otherwise unsubstituted. Generally, the sulfonated hydrocarbons should contain at least eight carbon atoms, preferable from about 10 to about 24 carbon atoms, and more preferably about 12 to 18 carbon atoms. Exemplary sulfonated hydrocarbons useful as organic collection reagents include sulfonated pentenes, hexenes, heptenes, octenes, nonenes, decenes, undecenes, dodecenes, tridecenes, tetradecenes, pentadecenes, hexadecenes, octadecenes, eicosenes, heneicosenes, doeicosenes, trieicosenes, tetraeicosenes and like alkenes, as obtained from natural and polymerization sources. The source of the hydrocarbon may be refined or crude and can contain minor amounts of other constituents that do not affect beneficiation and flotation.

The amount of sulfonated hydrocarbon used as a collector reagent can range from about 10 to about 2,000 grams, preferably from about 50 to about 500 grams, per ton of potassium sulfate contained in the mixture of potassium sulfate and mirabilite. In general, the amount of reagent to be used can be based on the amount of potassium sulfate crystals to be floated, e.g., grams of reagent per ton of potassium sulfate.

To promote the action of the collector reagents, there may also be present in the flotation system secondary and tertiary alcohols or mixtures thereof. In some embodiments the presence of an alcohol can produce additional foam that can aid in, and facilitate the floatation processes. The nature and quantity of the secondary and tertiary alcohol can vary. Examples of such alcohols include methylethyl carbinol, i-butyl alcohol, trimethyl carbinol, 2,4-dimethyl-3-ethyl-3-hexanol, methylamyl alcohol, diisobutyl carbinol, 2,6,8-trimethyl-4-nonanol, secondary amyl alcohol, tertiary amyl alcohol, methylisobutyl carbinol, and like secondary and tertiary alcohols. When used as a foam promoter, the secondary and tertiary alcohols are normally present in an amount from about 50 to about 150 or more grams per ton of total solids present in mixture of potassium sulfate and mirabilite processed.

The equipment and procedures in the flotation separation of potassium sulfate from mirabilite should be familiar to those skilled in the art of performing floatation separation. There may be used, for instance, Metso/Denver and WEMCO/Eimco flotation systems, and like flotation systems that introduce air bubbles through an impeller or disperse air provided from an independent source. Crystallization of potassium sulfate and mirabilite carried out within the temperature range of between about −2.7° C. and 1.8° C., result in crystals of a size that is satisfactory for flotation without further adjustment in particle size, for example, by grinding.

The following examples provide illustrative embodiments of the methods and processes described generally above and do not in any way limit the scope of the disclosure or claims.

EXAMPLE 1

To a brine saturated in potassium sulfate and mirabilite and cooled to −1.0° C., were added enough potassium sulfate and mirabilite to make a slurry containing 8.4% by weight potassium sulfate and 6.1% by weight mirabilite, the solids in the slurry being 58% by weight potassium sulfate and 42% by weight mirabilite. To this slurry were added a commercial sulfonated hydrocarbon (mostly sulfonated tetradecene and hexadecene) containing from 14 to 16 carbon atoms at a rate of 544 grams per ton of potassium sulfate, and methylisobutyl carbinol at a rate of 263 grams per ton of total solids. The treated slurry was subjected to froth flotation in a Denver Cell.

A float containing 90.0% potassium sulfate and a 10.0% mirabilite, entrainment free, was obtained and a residue containing 96.7% mirabilite and 3.3% potassium sulfate, entrainment free was also obtained.

EXAMPLE 2

A solids-free water solution containing 13.70 wt % potassium sulfate, 9.09 wt % sodium sulfate, 1.88 wt % sodium chloride and 75.33 wt % water was prepared by heating the components to about 80° C. This solution was gradually added to a cooled crystallizer that was always held below +1°

C. but above −2.8° C. Potassium sulfate and mirabilite were crystallized with the mother liquor containing residual concentrations of 7.91 wt % potassium sulfate and 6.73 wt % sodium sulfate. To this slurry were added 90 milligrams of a commercial sulfonated hydrocarbon containing from 14 to 16 carbon atoms (mostly sulfonated tetradecene and hexadecene) and 75 milligrams of methylisobutyl carbinol. The treated slurry was subjected to froth flotation in a Denver Cell.

A float weighing 114 grams that contained 56.8% potassium sulfate and a 43.2% mirabilite, entrainment free, was obtained and a residue weighing 124 grams that contained 99.88% mirabilite and 0.12% potassium sulfate, entrainment free, was also obtained.

A number of embodiments for separating purified potassium sulfate from glaserite have been described. Nevertheless, it will be understood that various modifications may be made without departing from the spirit and scope of this disclosure. For example, the stability of the solid phase of any of the compounds described herein, e.g., glaserite, potassium sulfate, mirabilite, sodium sulfate, etc., can be modified by both temperature and the concentration of certain impurities such as sodium chloride. While the methods described above disclose forming a slurry of potassium sulfate and mirabilite from a solution of dissolved glaserite a temperature between −2.7° C. and 1.8° C. (at standard, i.e., "sea level" or ambient pressure), the phase diagram of the compounds may be affected by supplying other soluble compounds to the solution from which the potassium sulfate and mirabilite are crystallized. Any combination of temperature and soluble impurities suitable to bring about the solubility requirements of the above disclosed methods are considered within the scope of the disclosure.

Accordingly, other embodiments are within the scope of the following claims.

What is claimed is:

1. A method comprising dissolving glaserite in water at an elevated temperature to produce a saturated or nearly saturated solution, and cooling said solution to a temperature between about −2.7° C. and about 1.8° C. so that the glaserite in said cooled solution converts into a mixture of potassium sulfate and mirabilite both as stable crystals.

2. The method of claim 1, further comprising recovering mirabilite from said solution.

3. The method of claim 2, wherein said recovered mirabilite is substantially purified.

4. The method of claim 3, wherein said recovered mirabilite comprises mirabilite with less than 1% impurities.

5. The method of claim 2, wherein said recovering purified mirabilite occurs after removing said potassium sulfate from said solution.

6. The method of claim 1, wherein said solution is saturated with glaserite.

7. A method comprising adding glaserite to a saturated solution of glaserite in water and mixing the solution for enough time at a temperature between about −2.7° C. and about 1.8° C. so that the glaserite in said cooled solution converts into a mixture of potassium sulfate and mirabilite both as stable crystals.

8. A method, comprising:
dissolving glaserite in water at an elevated temperature to produce a saturated or nearly saturated solution, and cooling said solution to a temperature between about −2.7° C. and about 1.8° C. so that the glaserite in said cooled solution converts into a mixture of potassium sulfate and mirabilite both as stable phases, wherein said potassium sulfate is recovered through a froth floatation process.

9. The method of claim 8, wherein said potassium sulfate recovered comprises less than 10% mirabilite, glaserite, or other contaminants.

10. The method of claim 8, wherein said froth flotation process comprises forming bubbles within said solution after said glaserite has decomposed into potassium sulfate and mirabilite, and wherein said bubbles carry said potassium sulfate to said solution surface.

11. The method of claim 10 wherein said bubbles comprise air or an inert gas.

12. The method of claim 10, further comprising a collector reagent.

13. The method of claim 12, wherein said collector reagent comprises a sulfonated hydrocarbon.

14. The method of claim 13, wherein said sulfonated hydrocarbon is a sulfonated unsaturated hydrocarbon.

15. The method of claim 14, wherein said sulfonated unsaturated hydrocarbon is a monoalkene.

16. The method of claim 13 wherein said sulfonated hydrocarbon comprises at least eight carbon atoms.

17. The method of claim 13, wherein said sulfonated hydrocarbon comprises one or more of sulfonated pentenes, hexenes, heptenes, octenes, nonenes, decenes, undecenes, dodecenes, tridecenes, tetradecenes, pentadecenes, hexadecenes, octadecenes, eicosenes, heneicosenes, doeicosenes, trieicosenes, and tetraeicosenes.

18. The method of claim 16, wherein said sulfonated hydrocarbon comprises one or more of a sulfonated 1-tetradecene, sulfonated 1-pentadecene, sulfonated 1-hexadecene, and sulfonated 1-octadecene.

19. The method of claim 13, wherein said sulfonated hydrocarbon is added to said solution in an amount equivalent to about 50 to 500 grams per ton of potassium sulfate contained therein.

20. A process for the production of purified potassium sulfate from glaserite comprising:
a. converting glaserite within an aqueous solution comprising glaserite into potassium sulfate and mirabilite by reducing said solution temperature to between about −2.7° C. and about 1.8° C.; and
b. separating said potassium sulfate and mirabilite using a froth floatation process, wherein said froth floatation process comprises adding a sulfonated hydrocarbon to said aqueous solution, wherein said sulfonated hydrocarbon comprises from about 12 to about 16 carbon atoms and is added in an amount equivalent to about 50 to 500 grams per ton of contained potassium sulfate crystals; and wherein said froth flotation produces a float containing predominantly potassium sulfate and a residual of non-floated material containing predominantly mirabilite.

21. The process of claim 20 wherein said potassium sulfate is recovered from said froth floatation process.

22. The process of claim 21, wherein said potassium sulfate comprises less than 10% mirabilite or other impurities.

23. The process of claim 21, wherein said aqueous solution is saturated in glaserite and at a temperature of between about −2.7° C. and about 1.8° C.

24. The process of claim 20, in which the sulfonated hydrocarbon is one or more of the following: sulfonated 1-tetradecene, sulfonated 1-pentadecene, sulfonated 1-hexadecene, or sulfonated 1-octadecene.

25. A method, comprising:
adding glaserite to a saturated solution of glaserite in water, and
mixing the solution for enough time at a temperature between about −2.7° C. and about 1.8° C. so that the glaserite in the solution converts into a mixture of potassium sulfate and mirabilite both as stable phases wherein said potassium sulfate is recovered through a froth floatation process.

26. The method of claim 25, wherein said potassium sulfate recovered comprises less than 10% mirabilite, glaserite, or other contaminants.

27. The method of claim 25, wherein said froth flotation process comprises forming bubbles within said solution after said glaserite has decomposed into potassium sulfate and mirabilite, and wherein said bubbles carry said potassium sulfate to said solution surface.

28. The method of claim 27, wherein said bubbles comprise air or an inert gas.

29. The method of claim 27, further comprising a collector reagent.

30. The method of claim 29, wherein said collector reagent comprises a sulfonated hydrocarbon.

31. The method of claim 30, wherein said sulfonated hydrocarbon is a sulfonated unsaturated hydrocarbon.

32. The method of claim 31, wherein said sulfonated unsaturated hydrocarbon is a monoalkene.

33. The method of claim 30, wherein said sulfonated hydrocarbon comprises at least eight carbon atoms.

34. The method of claim 30, wherein said sulfonated hydrocarbon comprises one or more of sulfonated pentenes, hexenes, heptenes, octenes, nonenes, decenes, undecenes, dodecenes, tridecenes, tetradecenes, pentadecenes, hexadecenes, octadecenes, eicosenes, heneicosenes, doeicosenes, trieicosenes, and tetraeicosenes.

35. The method of claim 33, wherein said sulfonated hydrocarbon comprises one or more of a sulfonated 1-tetradecene, sulfonated 1-pentadecene, sulfonated 1-hexadecene, and sulfonated 1-octadecene.

36. The method of claim 30, wherein said sulfonated hydrocarbon is added to said solution in an amount equivalent to about 50 to 500 grams per ton of potassium sulfate contained therein.

* * * * *